Patented Sept. 15, 1942

2,295,600

UNITED STATES PATENT OFFICE 2,295,600

PREPARATION OF PYRROLIDONE CARBOXYLIC ACIDS AND THEIR ESTERS AND PRODUCTS THEREOF

Samuel Natelson and Samuel J. Kahn, Brooklyn, N. Y.

No Drawing. Application May 19, 1939, Serial No. 274,662

11 Claims. (Cl. 260—313)

Our invention relates to pyrrolidone carboxylic acids and their esters and method of preparation of the same.

More specifically our invention relates to the method of preparation of these compounds by reacting a ketone or an aldehyde containing an active methylene group which is adjacent to the carbonyl group or their polymers or an aldol condensation product, with an aqueous solution of a salt of hydrocyanic acid. The aldehyde or ketones which undergo this reaction are of the general formula

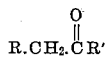

where R and/or R' may be hydrogen or alkyl, aryl or alicyclic group. Any compound which can give rise to an aldehyde, a ketone or an aldol may be employed as a base compound.

We may further obtain the pyrrolidone carboxylic acids and their esters by reacting alpha-unsaturated ketones with an aqueous solution of a salt of hydrocyanic acid.

We have found that the esters formed from the reaction of pyrrolidone carboxylic acid with hydroxy compounds are valuable as plasticizers for plastics and resins generally, including by way of example, cellulosic derivatives, such as the esters, cellulose acetate and cellulose nitrate and the ethers such as benzyl and ethyl cellulose and synthetic plastics generally including resins.

These plasticizers can be used alone or in combination with other plasticizers. These esters of pyrrolidone carboxylic acid are compatible with camphor and they may be used with facility in combination therewith, as for example, in plasticizing cellulose nitrate. Particularly valuable as plasticizers, because of their insolubility in water, are those alkyl esters of pyrrolidone carboxylic acids containing at least 3 carbon atoms, as for example, propyl ester of 2,4,4-tri-methyl pyrrolidone-5 carboxylic acid-2, and other higher esters such as are set forth specifically hereinafter.

These esters are also valuable as sedatives and soporifics.

The pyrrolidone carboxylic acids themselves may be used as plasticizers.

By reacting pyrrolidone carboxylic acids with the following alcohols, the various corresponding esters may be formed: propyl, butyl, amyl, hexyl, glycol, mono-methyl and -ethyl ethers of ethylene glycol, mono-methyl and -ethyl ethers of diethylene glycol, aliphatic nitro alcohols, ethenolamine, citronellol, terpineol, mono glycol esters, glycerol, mannitol, sorbitol, sugars, such as sucrose and glucose, chlor-hydrin, cyclo-hexanol, phenols and cresols, methyl cyclo-hexanol, and the analogues and homologues of the foregoing. Also, other alcohols may be employed.

With regard to the esters of the polyhydroxy alcohols and the higher esters of pyrrolidone carboxylic acids set forth above, we have found that their molecular structures give them the physical properties of resins and that they, therefore, may be employed as resins.

By way of example, the esterification may be effected by reacting dry HCl or concentrated sulfuric acid with the desired pyrrolidone carboxylic acid and the desired alcohol. For esterification with the higher boiling alcohols, we may simply heat together the pyrrolidone carboxylic acid with the desired alcohol to a temperature sufficient to distill off the water with or without the aid of some catalyst, such as boric acid or metallic aluminum.

We have found further that the amides particularly the alkyl and aryl substituted amides are also useful as plasticizers.

By reacting pyrrolidone carboxylic acids with the following amines the various corresponding amides may be formed: e. g. aniline, cyclohexylamine, ethanol amine, butyl amine, ethylamine, nitraniline, nitro butyl amine, and chloranilines, etc.

These can readily be formed by merely heating the desired amine with the desired pyrrolidone carboxylic acid. These amides are particularly valuable as sedatives and soporifics.

We have found also that the corresponding thio amides, such as, for example, ethyl thioamide of pyrrolidone carboxylic acid are also good soporifics and sedatives.

The ureides and substituted ureides can be formed from the esters of these pyrrolidone carboxylic acids by heating. The condensation is effected more readily using alkaline condensation media, such as sodium alcoholates. Thio urea and substituted thio ureas can be readily substituted for the ureas mentioned above to obtain the desired thio ureide. The ureides and thio ureides are particularly powerful soporifics and sedatives. Examples are pyrrolidone carboxylic acid ureide or thioureide.

Further the pyrrolidone carboxylic acids themselves or their derivatives have antiseptic properties and may be used as urinary antiseptics. These pyrrolidone carboxylic acids are non-toxic and serve as accelerators for the growth of plants and animals both as a food and stimulant.

Reduction under high temperatures and pressure of these pyrrolidone carboxylic acids, i. e. 100 atmospheres and 200° C., with a nickel catalyst produces valuable pyrrol carboxylic acids. The esters of these acids can be reduced catalytically under the conditions recited above to the corresponding alcohols by means of any of the usual catalysts such as nickel, platinum, or copper chromite. The pyrrol acids can be decarboxylated to form valuable organic bases.

The definitions of the terms we employ are as follows:

An aldol is a compound in which a molecule of a carbonyl compound forms an addition compound with itself or another carbonyl compound forming a carbon to carbon linkage with or without the elimination of water, i. e.

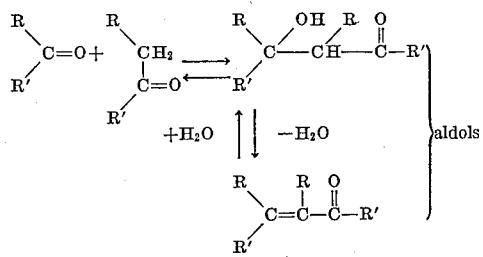

(This reaction is reversible)

By a carbonyl group we mean

By a keto group we mean

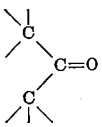

i. e. a carbonyl group between two carbons.

By an alpha unsaturated carbonyl group or a carbonyl group with an ethylenic linkage adjacent to the carbonyl group, we mean

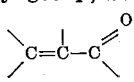

These pyrrolidone carboxylic acids, their esters, or amides can be caused to polymerize or can be condensed with aldehydes, such as formaldehyde, to form polymeric compounds having the physical and chemical properties of synthetic resins and plastics. These compounds are moldable and can be extruded in various forms under proper temperatures and pressures.

These pyrrolidone carboxylic acids are also useful as detergents, wetting agents and emulsifiers when combined with long-chain alcohols, such as cetyl or oleyl alcohols.

Pyrrolidone carboxylic acids themselves are useful as intermediates in the production of valuable non-toxic dyes of the 5 membered heterocyclic series. They may also be employed as intermediate in the preparation of porphyrins.

We form the pyrrolidone carboxylic acids of our invention by reacting ketones, such as acetone or butanone-2 or acetophenone with an aqueous solution of a salt of hydrocyanic acid. Although the reaction can work in relatively concentrated aqueous solutions of hydrocyanic acid salts, for superior results the aqueous solution should contain substantially no more than 35% of the salt of hydrocyanic acid and preferably it contains from 10 to 25% of such salt.

Other typical ketones which we may employ are by way of example but not of limitation, butanone-2, pentanone-2, phenylacetone, cyclohexyl methyl ketone, cyclo-hexanone, methyl cyclo hexanones, cyclo pentanones, aryl substituted acetophenones and phenyl acetones, and diethyl ketone.

Compounds which break down to form these ketones under the conditions of this reaction by de-aldolization, hydrolysis, or depolymerization, may be employed. For example—di-acetone alcohol de-aldols to form acetone. Mesityl oxide de-aldols likewise.

The salt of hydrocyanic acid which we prefer to employ is sodium cyanide, although potassium cyanide, or barium, calcium, copper or ammonium cyanides may be used. The reaction is preferably carried out at elevated temperatures and this is particularly necessary with the less reactive ketones, such as butanone-2.

In our process for the production of pyrrolidone carboxylic acids we preferably employ an initial reacting temperature of approximately 85° C. and we may employ higher temperatures, in which case we provide the necessary pressures to prevent a too rapid escape of the volatile ketone and the water. Although the reaction can be carried out at lower temperatures than indicated above, the time necessary for reaction is, in that event, extremely long.

When the operation is carried out under pressure, we may or may not allow the escape of free developed ammonia. If the ammonia is retained, then, later volatilization disposes of undesired ammonia.

When the reaction is carried out in a completely sealed container without allowing the ammonia to escape, it is possible by regulating the time of the reaction and the pH+, to isolate substantially all of the pyrrolidone carboxylic acid as its amide.

Another method of keeping the reaction at an elevated temperature is to set up a cyclic system whereby the volatile aldehyde or ketone is constantly distilled off through a fractionating column, condensed, and then allowed (the condensed material) to flow back at the same rate at which it distils over.

The reaction is in some cases initiated with difficulty and may be facilitated by the use of a catalyst such as a reacted solution from a previous run. In some cases raising the pH+ as by means of alkalis such as sodium hydroxide will accelerate the initiation of the reaction, and the continuation of the same.

The reactions are carried out with the reactants above set forth for sufficient time until the formation of ammonia from the solution has substantially ceased.

Structurally, the reaction may be represented as follows:

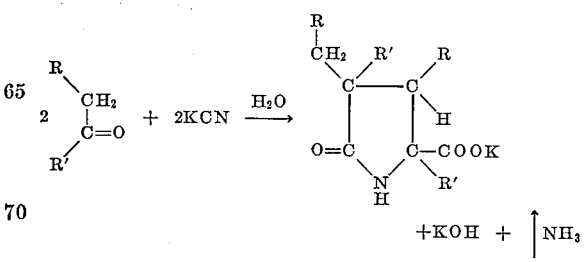

R, or R': both or either may be any alkyl, aryl or alicyclic group or hydrogen. When R' is hydrogen the compound is an aldehyde (discussed below). Otherwise the compound is a ketone. The mother compound of the group is 2 carboxy pyrrolidone 5.

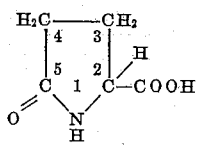

Esters and other derivatives of this acid are excellent plasticizers for the following reasons. At position 1,5 there exists an amide linkage with resultant oscillation of the hydrogen between the oxygen and the nitrogen. This type of condition lends for residual valences with resultant tendency to form molecular addition products with the material being plasticized. Although ordinary amides are readily hydrolyzed by acids or alkalis, the group in this compound is stable towards these reagents because of the formation of the stable 5 membered ring. In our experience the compound is resistant to hydrolysis by strong alkalis or acids at high temperatures. The COOH group affords a convenient means for varying the properties of the compound by forming the various acid derivatives.

Examples of our method are as follows:

*Example I*

Fifteen to thirty moles of acetone is reacted with 980 grams of sodium cyanide or the equivalent amount of any of the other cyanide salts dissolved in 5 liters of water. This mixture is refluxed for a substantial period of time, on the order of 15 hours or more, until there is no further substantial evolution of ammonia in the solution.

If an excess of acetone has been used, the unreacted acetone is first distilled off whereupon the reaction mixture is then cooled and acidified and the precipitated 2,2,4-tri-methyl 2-carboxy pyrrolidone-5 is filtered off.

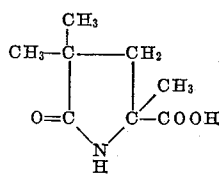

Alternatively to the above, it is possible to employ in lieu of the salt of hydrocyanic acid, a treatment in which the acetone is first treated with the required corresponding amount of hydrocyanic acid and then reacted with an aqueous solution of an alkali, such as sodium or potassium hydroxide.

*Example II*

Fifteen to thirty moles of acetone are reacted with 980 grams of sodium cyanide in 10 liters of water in an autoclave at about 110° C. for from 5 to 10 hours. The course of reaction is followed by means of a pressure guage. When the pressure has fallen to a predetermined value, the reaction mixture is cooled, and then refluxed at atmospheric pressure until all the ammonia has been evolved. The excess acetone, if any, is distilled off. The mixture is acidified and the 2,2,4-tri-methyl 2-carboxy-pyrrolidone-5 is isolated as set forth before.

*Example III*

Ten to twenty moles of butanone-2 is reacted with 980 grams of sodium cyanide dissolved in 5 liters of water. This mixture is heated under pressure so that the temperature can be raised to about 85° to 120° centigrade. The mixture is vigorously stirred during the heating and the action is continued until the formation of ammonia in the solution has substantially ceased. The ammonia may be allowed to escape through a pressure valve. If the ammonia has not been allowed to escape, it is volatilized by heat or vacuum before acidification. The reaction mixture is then cooled, acidified and evaporated to dryness. It is then extracted with the required alcohol and esterification effected by passing HCl gas through the alcoholic solution or by adding sulfuric acid and refluxing. We thus form the ester according to the alcohol employed of a mixture of 2,4-diethyl 4-methyl 2-carboxy pyrrolidone-5, and of 2,3,4-trimethyl 4-ethyl 2-carboxy pyrrolidone-5. That is,

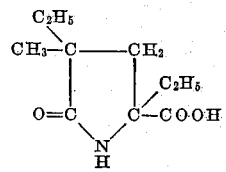

and

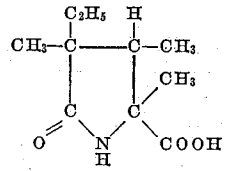

*Example IV*

In lieu of employing an aqueous solution of a salt of hydrocyanic acid we may add HCN to the acetone and subsequently react the mixture with a dilute alkali to obtain the pyrrolidone carboxylic acid.

Our process further comprises the formation of pyrrolidone carboxylic acids by reacting alpha unsaturated ketones such as mesityl oxide or 3-methyl heptene-3-one-5 or 3,4-dimethyl hexene-3-one-2 or pentene 3-one-2 or dipnone or cyclo hexenone or methyl cyclo hexenone with the aqueous solution of a salt of hydrocyanic acid.

It is of fundamental importance in this reaction that an aqueous medium be employed, since we have found that the aqueous medium effects the isolation of the pyrrolidone carboxylic acid in the substantial absence of by-products. Further by the use of an aqueous medium the necessary hydrolysis of the nitriles formed is facilitated and the required temperature can be obtained at atmospheric pressure.

A sufficient time, on the order of 10 to 80 hours, must be allowed for the completion of the reaction, unless higher temperatures (under pressure) than the refluxing temperature of the mixture are resorted to.

If excess of the alpha unsaturated ketone is employed, the excess is subsequently recovered as a de-aldolization product. For example, excess of mesityl oxide yields 2 mols of acetone for one of mesityl oxide.

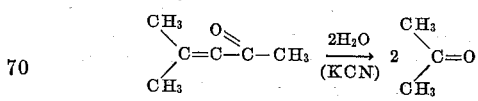

This would lower the reaction temperature, under reflux, and hence we may choose to complete the reaction under pressure to maintain the original temperature of the reaction. This would also indicate why the use of the ketone, for example acetone and/or its product of aldolization (mesityl oxide or diacetone alcohol) would result in the same reaction. Similarly an aldolization product of two different ketones could be substituted by the two ketones in question in equimolar quantities. For purposes of economy it is usually desirable to use the ketone before aldolization.

Examples of our method are:

Example I

Eight to fifteen moles of mesityl oxide is added to 980 grams of sodium cyanide or 1300 grams of potassium cyanide dissolved in 5 liters of water. The mixture is refluxed with vigorous stirring until no more ammonia is liberated (approximately 24 to 33 hours). The reaction mixture is cooled and acidified and the precipitated 2,2,4-tri-methyl 2-carboxy pyrrolidone-5 is filtered off. A mixture of acetone and mesityl oxide may be employed in lieu of the mesityl oxide above. This mixture of acetone and mesityl oxide should supply the same number of moles of acetone as the mesityl oxide could if hydrolyzed in the example above.

Example II

Eight to fifteen moles of mesityl oxide is added to 980 grams of sodium cyanide or 1300 grams of potassium cyanide dissolved in 5 liters of water. The mixture is heated under pressure at a temperature of about 130° C. with stirring until formation of ammonia ceases in the solution. $NH_3$ is removed by volatilization and the solution is acidified.

Example III

Eight to fifteen moles of mesityl oxide is added to 980 grams of sodium cyanide in 8 liters of water. The mixture is refluxed with vigorous stirring until complete solution has taken place (about 3 hours). The mixture is then transferred to an autoclave where heating is continued at 90–100° C. for sufficient time until all the ammonia has been formed (about 7 to 15 hours). The ammonia and excess acetone is evaporated off. The mixture is acidified and worked up as above.

Referring to the example given above we may employ in lieu of the mesityl oxide there set forth 3-methyl heptene-3-one-5 or 3,4-dimethyl hexene-3-one-2, or dipnone. The proportions and times given in that example are applicable with respect to these alternative substances.

A further process of our invention by means of which we can form the pyrrolidone carboxylic acids comprises reacting various aldehydes, such as acetaldehyde, butyraldehyde, phenyl acetaldehyde, and the like with an aqueous solution of a salt of hydrocyanic acid.

In employing the aldehydes in this reaction we have found it advisable to use a buffer agent, such as sodium bicarbonate, ammonium chloride, sodium acid phosphate or sodium acetate, which buffer agent acts to adjust the $pH^+$ value of the solution. Without employing this buffer agent we find that the aldehyde tends to polymerize to form resins which interfere with the reaction. This is particularly so when we employ salts of cyanides which are definitely strongly basic, as for example sodium cyanide or potassium cyanide.

The aqueous salt solution should contain no more than about 35% of the cyanide salt and preferably from 15 to 25%.

Adjustment and control of the $pH^+$ during the course of the reaction is an important factor for good yields. The $pH^+$ to be maintained depends on the particular compound used and whether it be ketone or aldehyde.

By way of specific example, we employ 10 to 20 moles of acetaldehyde which is stirred into 980 grams of sodium cyanide dissolved in six liters of water containing 840 grams of sodium bicarbonate (buffer agent). The mixture is heated to about 90° C. and is continued until the evolution of the ammonia from the solution substantially ceases. Because of the fact that acetaldehyde is relatively volatile, and may be lost from the solution upon heating, we prefer to carry out this reaction under pressure. An added advantage of the use of pressure lies in the fact that higher temperature may be employed to accelerate the reaction.

After the reaction has been completed the solution is acidified and evaporated to dryness. The residue is extracted with anhydrous methyl alcohol and the 4-methyl 2-carboxy pyrrolidone-5 is recovered by evaporating the methyl alcohol solution to dryness.

A further method of our invention for forming the pyrrolidone carboxylic acids comprises reacting alpha unsaturated aldehydes, as for example, crotonaldehyde, 2-ethyl hexene-2-al-1, 3-methyl butene-2-al-1, acrolein, and the like with the above salts of hydrocyanic acid. These compounds may be considered as aldol condensation products of aldehydes either with themselves or between two different aldehydes.

In this reaction the use of a buffer agent as above described is advisable. The use of the buffer agent may be avoided if the reaction is carried out by adding first hydrocyanic acid under anhydrous conditions with or without the use of a suitable diluent followed by boiling with aqueous solutions of alkalis or acids to form the corresponding pyrrolidone carboxylic acid.

Ten to twenty moles of crotonaldehyde is added dropwise to a refluxing and vigorously stirred mixture of 980 grams of sodium cyanide (1300 grams of potassium cyanide) dissolved in six liters of water containing 840 grams of sodium bicarbonate. The mixture is refluxed until ammonia ceases to be given off. The solution is acidified and evaporated to dryness. The organic material is extracted with anhydrous methyl alcohol and the 4-methyl 2-carboxy pyrrolidone-5 is recovered by evaporating the methyl alcohol solution to dryness.

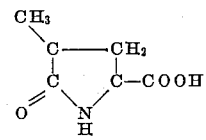

As previously set forth, we may carry out the above reaction under higher temperature and pressure in order to shorten the time of reaction.

Dry hydrogen cyanide gas is bubbled into crotonaldehyde solution until the weight of the solution has increased to the desired amount; that is until the weight indicates that 2 moles of hydrogen cyanide gas have been absorbed for every mole of crotonaldehyde.

An inert diluent may be used, such as ethyl alcohol. The reaction mixture so formed is now heated either with a 10% solution of potassium hydroxide or a concentrated solution of hydrochloric acid to hydrolyze the product to form the 4-methyl 2-carboxy pyrrolidone-5.

We have exampled specific methods by means of which we can form the pyrrolidone carboxylic acids and their esters. It is to be understood, however, that we wish to be limited not by the specific methods and materials set forth but only by the appended claims.

We claim:

1. The method of forming a 5-pyrrolidone 2-carboxylic acid which comprises reacting a compound containing a keto group adjacent to a carbon, to which at least two hydrogens are attached, with an aqueous medium containing cyanide ions, under heat until substantially all of the ammonia given off during the reaction is eliminated.

2. The method of forming a 5-pyrrolidone 2-carboxylic acid which comprises reacting acetone with an aqueous medium containing cyanide ions, at a temperature that is at least the refluxing temperature of the mix for sufficient time so that hydrolysis of substantially all cyan hydrins initially formed takes place.

3. The method of forming a 5-pyrrolidone 2-carboxylic acid which comprises reacting an aldol condensation product of a compound containing a carbonyl group adjacent to a carbon, to which at least two hydrogens are attached, with an aqueous medium containing cyanide ions at a temperature that is at least the refluxing temperature of the mix for sufficient time so that hydrolysis of substantially all cyan hydrins initially formed takes place.

4. The method of forming a 5-pyrrolidone 2-carboxylic acid which comprises reacting mesityl oxide with an aqueous medium containing cyanide ions at a temperature that is at least the refluxing temperature of the mix for sufficient time so that hydrolysis of substantially all cyan hydrins initially formed takes place.

5. The method of forming a 5-pyrrolidone 2-carboxylic acid which comprises reacting a ketone containing the keto group adjacent to a carbon, to which at least two hydrogens are attached, with an aqueous medium containing cyanide ions at a temperature which is at least the refluxing temperature of the mix for sufficient time so that hydrolysis of substantially all cyan hydrins initially formed takes place, and adjusting the hydrogen ion concentration during the reaction.

6. The method of forming a 5-pyrrolidone 2-carboxylic acid which comprises reacting at at least refluxing temperatures and under pressure a ketone containing the keto group adjacent to a carbon, to which at least two hydrogens are attached, with an aqueous medium containing cyanide ions, the refluxing temperature being applied for sufficient time so that hydrolysis of substantially all cyan hydrins initially formed takes place.

7. The method of forming 5-pyrrolidone 2-carboxylic acid which comprises reacting a compound which contains an ethylenic linkage in a position alpha to a carbonyl group with an aqueous medium containing cyanide ions at refluxing temperature until the formation of ammonia has substantially ceased.

8. The method of forming a 5-pyrrolidone 2-carboxylic acid which comprises reacting a mixture of a ketone containing the keto group adjacent to a carbon, to which at least two hydrogens are attached, and its aldol condensation product, with an aqueous medium containing cyanide ions at a temperature which is at least the refluxing temperature of the mix for sufficient time so that hydrolysis of substantially all cyan hydrins initially formed takes place.

9. The method of forming 5-pyrrolidone 2-carboxylic amides which comprises reacting a ketone containing the keto group adjacent to a carbon, to which at least two hydrogens are attached, with an aqueous medium containing cyanide ions at refluxing temperature and under pressure for sufficient time until hydrolysis of substantially all cyan hydrins initially formed takes place, and retaining the ammonia within the reaction mix.

10. The method of forming a 5-pyrrolidone 2-carboxylic acid which comprises reacting a polymer of a ketone containing the keto group adjacent to a carbon, to which at least two hydrogens are attached, with an aqueous medium containing cyanide ions at a temperature which is at least the refluxing temperature of the mix for sufficient time so that hydrolysis of substantially all cyan hydrins initially formed takes place.

11. A plasticized composition including as a plasticizer, an ester of a 5-pyrrolidone 2-carboxylic acid, the ester group containing at least three carbon atoms.

SAMUEL NATELSON
SAMUEL J. KAHN.